US010794997B2

(12) United States Patent
Amihood et al.

(10) Patent No.: US 10,794,997 B2
(45) Date of Patent: Oct. 6, 2020

(54) SMARTPHONE-BASED POWER-EFFICIENT RADAR PROCESSING AND MEMORY PROVISIONING FOR DETECTING GESTURES

(71) Applicant: Google LLC, Mountain View, CA (US)

(72) Inventors: Patrick M. Amihood, Palo Alto, CA (US); Abhijit Aroon Shah, Foster City, CA (US); Emanoil Felician Bors, Grass Valley, CA (US)

(73) Assignee: Google LLC, Mountain View, CA (US)

( * ) Notice: Subject to any disclaimer, the term of this patent is extended or adjusted under 35 U.S.C. 154(b) by 143 days.

(21) Appl. No.: 16/106,315

(22) Filed: Aug. 21, 2018

(65) Prior Publication Data

US 2020/0064445 A1 Feb. 27, 2020

(51) Int. Cl.
G01S 7/41 (2006.01)
G01S 13/58 (2006.01)
H04M 1/02 (2006.01)
H04W 52/02 (2009.01)
G06F 3/01 (2006.01)
G01S 13/00 (2006.01)

(52) U.S. Cl.
CPC .............. *G01S 7/414* (2013.01); *G01S 13/58* (2013.01); *G06F 3/017* (2013.01); *H04M 1/0202* (2013.01); *H04W 52/0261* (2013.01)

(58) Field of Classification Search
CPC ..................................................... G01S 7/415
See application file for complete search history.

(56) References Cited

U.S. PATENT DOCUMENTS 8,922,485 B1 * 12/2014 Lloyd .................... G06F 3/017
345/156
9,335,825 B2 * 5/2016 Rautiainen ............. G06F 3/017
9,575,560 B2 * 2/2017 Poupyrev ............... G06F 3/017
(Continued)

OTHER PUBLICATIONS

"EP Appeal Decision", European Application No. 10194359.5, dated May 28, 2019, 20 pages.
(Continued)

*Primary Examiner* — Bernarr E Gregory
(74) *Attorney, Agent, or Firm* — Colby Nipper PLLC

(57) ABSTRACT

Techniques and apparatuses are described that implement smartphone-based power-efficient radar processing and memory provisioning for detecting gestures. The described techniques map different situations that occur with a user to different memory states. A radar processing system's memory management module allocates at least one memory pool according to an active memory state. As the radar system detects different situations that occur with the user, the memory management module reallocates the memory pool for the appropriate memory state, which can adjust a power mode of the radar system. In some cases, physically separate memories may be allocated for different memory states, which respectively include one or more sequences that are executed by different processors. The memory management module enables efficient use of available power and available memory for radar processing such that a total amount of power and a total size of memory used may be significantly reduced for detecting gestures.

20 Claims, 11 Drawing Sheets

(56) References Cited

U.S. PATENT DOCUMENTS

| | | | | |
|---|---|---|---|---|
| 9,600,080 | B2* | 3/2017 | Poupyrev | G01S 7/415 |
| 9,778,749 | B2* | 10/2017 | Poupyrev | G06F 3/017 |
| 9,811,164 | B2* | 11/2017 | Poupyrev | G06F 3/017 |
| 9,921,660 | B2* | 3/2018 | Poupyrev | G06F 3/017 |
| 10,168,776 | B2* | 1/2019 | Billau | G06F 3/017 |
| 10,241,581 | B2* | 3/2019 | Lien | G01S 13/58 |
| 10,310,621 | B1* | 6/2019 | Lien | G06F 3/017 |
| 10,409,385 | B2* | 9/2019 | Poupyrev | G06F 3/017 |
| 10,509,478 | B2* | 12/2019 | Poupyrev | G06F 3/017 |
| 10,579,154 | B1* | 3/2020 | Lien | G06F 3/017 |
| 2011/0181509 | A1* | 7/2011 | Rautiainen | G06F 3/017 |
| | | | | 345/158 |
| 2011/0181510 | A1* | 7/2011 | Hakala | G06F 3/017 |
| | | | | 345/158 |
| 2012/0280900 | A1* | 11/2012 | Wang | G06F 3/017 |
| | | | | 345/156 |
| 2014/0195988 | A1* | 7/2014 | Kramer | G06F 3/017 |
| | | | | 715/863 |

OTHER PUBLICATIONS

"Galaxy S4 Air Gesture", Galaxy S4 Guides, retrieved from: https://allaboutgalaxys4.com/galaxy-s4-features-explained/air-gesture/ on Sep. 3, 2019, 4 pages.

"Samsung Galaxy S4 Air Gestures", Video retrieved from https://www.youtube.com/watch?v=375Hb87yGcg, May 7, 2013, 4 pages.

* cited by examiner

SMARTPHONE-BASED POWER-EFFICIENT RADAR PROCESSING AND MEMORY PROVISIONING FOR DETECTING GESTURES

BACKGROUND

Radars are useful devices that can detect and track targets. While radar is a common tool used in military and air-traffic-control operations, technological advances are making it possible to integrate radars in commercial devices. In many cases, a radar may replace bulky and expensive sensors, such as a camera, and provide improved performance in the presence of different environmental conditions, such as low lighting and fog, or with moving or overlapping targets. While it may be advantageous to use radar, there are many challenges associated with integrating radar in commercial devices, such as smart phones.

Two such challenges involve power consumption and memory usage. If the available power or memory is constrained, for example, effective operation or capability of some radars may be significantly reduced. This may limit the types of applications the radar can support or the types of consumer devices the radar can be implemented within.

SUMMARY

Techniques and apparatuses are described that implement smartphone-based power-efficient radar processing and memory provisioning for detecting gestures. The described techniques map different situations that occur with a user to different memory states. A radar processing system's memory management module allocates at least one memory pool according to an active memory state. As a radar system detects different situations that occur with the user, the memory management module reallocates the memory pool for the appropriate memory state, which can adjust a power mode of the radar system. In some cases, physically separate memories may be allocated for different memory states, which respectively include one or more sequences that are executed by different processors. The memory management module enables efficient use of available power and available memory for radar processing such that a total amount of power and a total size of memory used may be significantly reduced for detecting gestures.

Aspects described below include a smartphone comprising a radar system. The radar system includes a computer-readable storage medium and a memory management module. The memory management module is configured to instantiate a memory pool within the computer-readable storage medium. The memory management module is also configured to adjust an allocation of memory within the memory pool according to different memory states that are respectively activated at different times according to different situations that occur with a user. The different memory states include a first memory state that is activated responsive to a first situation of the different situations that includes the user being outside a detectable range of the radar system. The different memory states also include a second memory state that is activated responsive to a second situation of the different situations that includes the user performing a gesture.

Aspects described below also include an apparatus comprising a computer-readable storage medium comprising computer-executable instructions that, responsive to execution by a processor, implement a memory management module configured to instantiate a memory pool within the computer-readable storage medium to allocate a portion of the computer-readable storage medium for processing radar data. The memory management module is also configured to adjust an allocation of memory within the memory pool according to different memory states that are respectively activated at different times according to different situations that occur with a user. The different memory states include one or more sequences that process the radar data responsive to execution by the processor.

Aspects described below also include a method that enables power-efficient radar processing and memory provisioning for detecting gestures. The method includes instantiating a memory pool within a computer-readable storage medium. Responsive to a first situation occurring with a user, the method includes activating a first memory state. The activating comprises allocating memory within the memory pool according to the first memory state. The method also includes processing, based on the first memory state, radar data generated by a radar system. The processing utilizes the memory pool. Responsive to a second situation occurring with the user, the method includes activating a second memory state. The activating comprises reallocating the memory within the memory pool according to the second memory state. The method also includes processing, based on the second memory state, the radar data generated by the radar system. The processing reuses at least a portion of the memory pool.

Aspects described below also include a system with means for allocating memory according to different memory states associated with different situations that occur with a user.

BRIEF DESCRIPTION OF THE DRAWINGS

Apparatuses for and techniques of smartphone-based power-efficient radar processing and memory provisioning for detecting gestures are described with reference to the following drawings. The same numbers are used throughout the drawings to reference like features and components:

FIG. 3-1 illustrates example provisioning of a memory by a memory management module for gesture detection.

FIG. 3-2 illustrates example provisioning of multiple memories by a memory management module for gesture detection.

FIG. 4-1 illustrates example memory states for smartphone-based power-efficient radar processing and memory provisioning.

FIG. 4-2 illustrates an example sequence for smartphone-based power-efficient radar processing and memory provisioning.

FIG. 4-3 illustrates different forms of execution of multiple sequences within an active memory state.

DETAILED DESCRIPTION

It may be challenging to integrate a radar in commercial devices. Some radar systems, for example, may significantly drain a battery of a commercial device and limit a duration of mobile operation. In other cases, the commercial device may not have sufficient memory available to perform computationally-intensive radar processing techniques. As a result, the radar system may have a higher false-alarm rate, may generate less accurate or less precise data, or may be limited to performing simple functions.

In contrast, this document describes techniques and devices for implementing smartphone-based power-efficient radar processing and memory provisioning for detecting gestures. The described techniques map different situations that occur with a user to different memory states. Example memory states include an idle state in which the user is not present, a presence state in which the user is present though far from the radar, an awareness state in which the user is close to the radar, or an engagement state in which the user is actively engaging with the radar system (e.g., by performing a gesture). A radar processing system's memory management module instantiates (or creates) a memory pool and allocates the memory pool for an active memory state. As different situations occur, the memory management module reallocates the memory pool for the appropriate memory state to efficiently utilize the available memory.

Overview

Each memory state includes one or more radar processing sequences, which may be executed if the memory state is active. A sequence configures the radar system for data collection and processes the radar data that is generated by the radar system. Some memory states include sequences that are designed to cause the radar system to operate according to different power modes. The sequences within the memory states may also be designed to be executed by different processors that consume different amount of power. A low-power memory state executed via a low-power processor may then activate a high-power memory state executed via a high-power processor upon detecting a situation that warrants an increase in power consumption. By using the low-power memory state, power can be conserved by significantly reducing a duration for which the high-power memory state is active. The memory management module efficiently utilizes the available memory by enabling different memory states or sequences to share information with each other. By sharing information and transitioning between different memory states, a total size of the allocated memory may be significantly reduced. This document now turns to an example environment, after which an example apparatus, an example method, and an example computing system are described.

Example Environment

Figure 1:
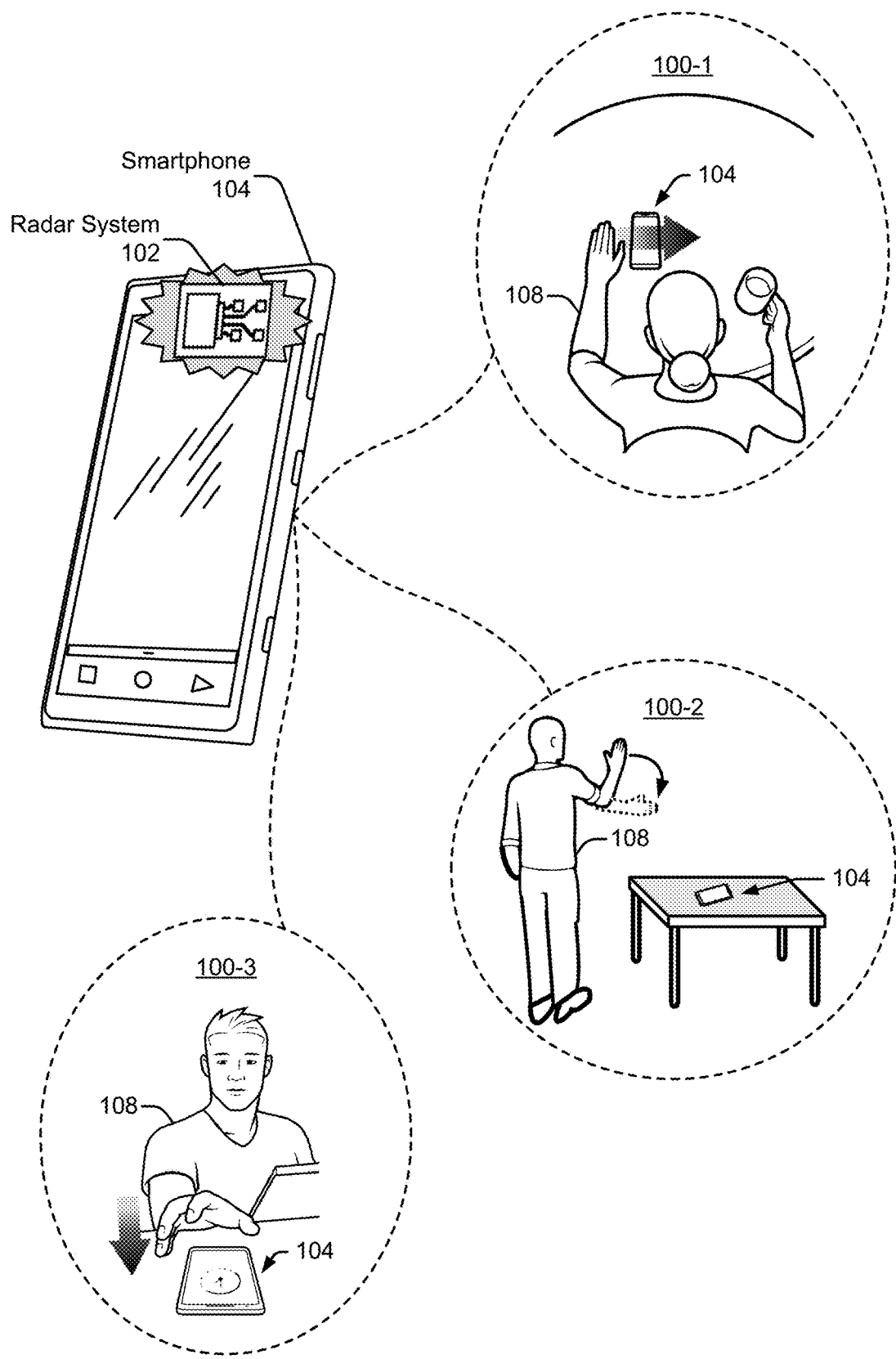
FIG. 1 illustrates example environments in which smartphone-based power-efficient radar processing and memory provisioning for detecting gestures can be implemented.

FIG. 1 is an illustration of example environments in which smartphone-based power-efficient radar processing and memory provisioning for detecting gestures may be implemented. In the depicted environments 100-1, 100-2, and 100-3, a radar system 102 is embedded within a smartphone 104. Some embodiments of the radar system 102 are particularly advantageous as applied in the context of smartphones, such as the smartphone 104, for which there is a convergence of issues such as a need for low power, a need for processing efficiency, limitations in a spacing and layout of antenna elements, and other issues, and are even further advantageous in the particular context of smartphones for which radar detection of fine hand gestures is desired. Although the embodiments are particularly advantageous in the described context of a smartphone for which fine radar-detected hand gestures is required, it is to be appreciated that the applicability of the features and advantages of the present invention is not necessarily so limited, and other embodiments involving other types of electronic devices may also be within the scope of the present teachings. Although shown being implemented within the smartphone 104, the radar system 102 may be implemented within any suitable computing or electronic device, as described in further detail with respect to FIG. 2. The radar system 102 may be configured to track a user's gestures for touch-free control, detect a presence of one or more users, track one or more users around the smartphone 104 for specific applications, and so forth.

Exemplary overall lateral dimensions of the smartphone 104 can be, for example, approximately eight centimeters by approximately fifteen centimeters. Exemplary footprints of the radar system 102 can be even more limited, such as approximately four millimeters by six millimeters with antennas included. Exemplary power consumption of the radar system 102 may be on the order of a few milliwatts to several milliwatts (e.g., between approximately two milliwatts and twenty milliwatts). The requirement of such a limited footprint for the radar system 102, which is needed to accommodate the many other desirable features of the smartphone 104 in such a space-limited package (e.g., a camera, a fingerprint sensor, a display, and so forth) combined with power and processing limitations, can lead to compromises in the accuracy and efficacy of radar gesture detection, at least some of which can be overcome in view of the teachings herein.

In the environment 100-1, a user 108 makes a scrolling gesture by moving a hand above the smartphone 104 along a horizontal dimension (e.g., from a left side of the smartphone 104 to a right side of the smartphone 104). A waving gesture is made by another user 108 in the environment 100-2 as the user 108's arm rotates about an elbow. In the environment 100-3, a user 108 reaches for the smartphone 104 by moving a hand towards the smartphone 104. Other types of gestures or motions may also be made. For example, a knob-turning gesture may be made by curling fingers of a hand to grip an imaginary door knob. The fingers and hand are rotated in a clockwise or counter-clockwise fashion to mimic an action of turning the imaginary door knob. Another example spindle-twisting gesture may be performed by rubbing a thumb and at least one other finger together. Still other types of gestures include a two-finger pinch and spread, a finger tap, multi-dimensional gestures usable with touch-sensitive displays, sign-language gestures, and so forth. Each of these example gesture types may be detected by the radar system 102. Upon detecting a gesture, the smartphone 104 may perform an action, such as display new content, move a cursor, activate one or more sensors, open an application, and so forth. In this way, the radar system 102 provides touch-free control of the smartphone 104. Respective implementations of the radar system 102 and the smartphone 104 are further described with respect to FIG. 2.

Figure 2:
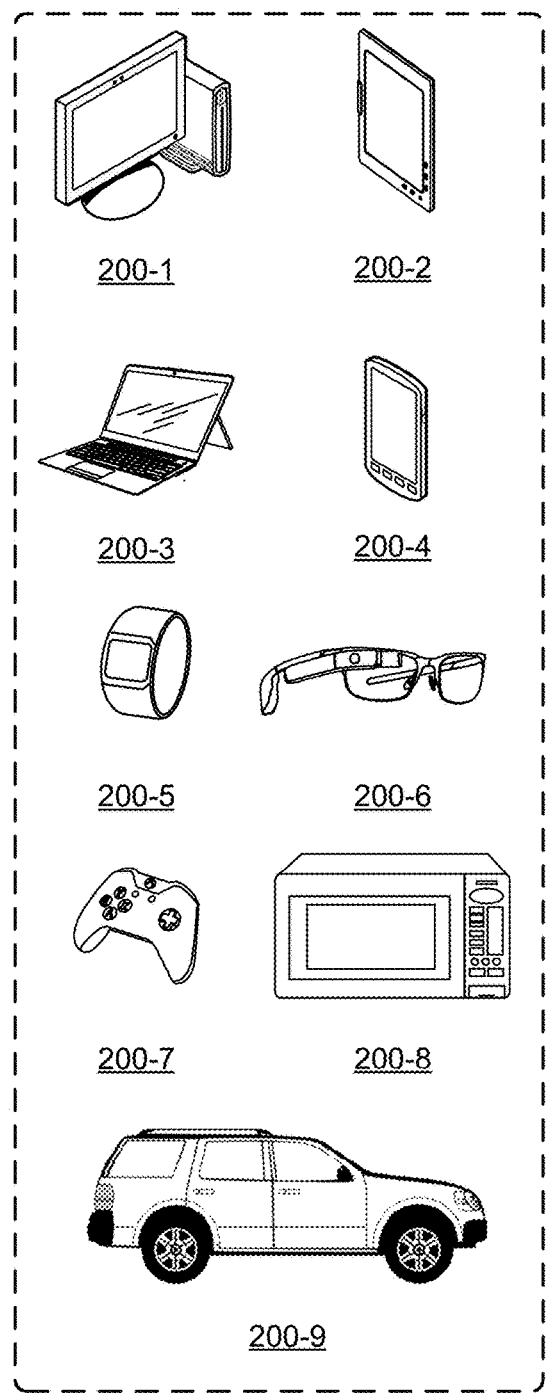
FIG. 2 illustrates an example radar system as part of a smartphone.
Figure 2:
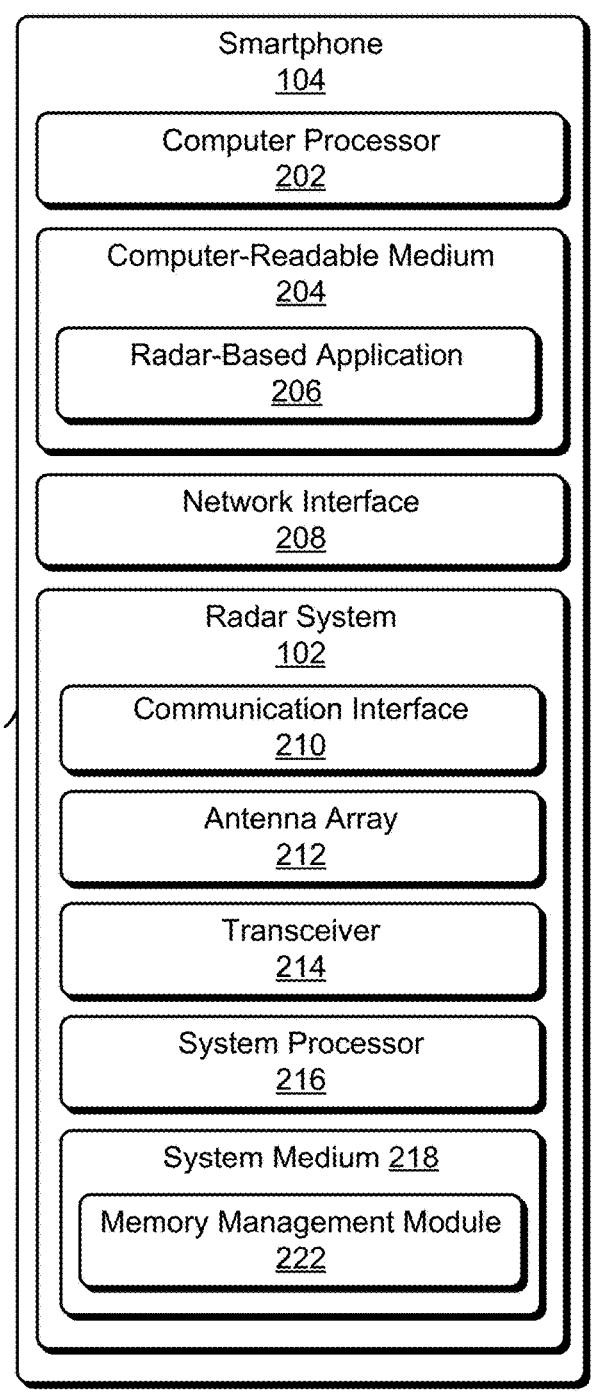

FIG. 2 illustrates the radar system 102 as part of the smartphone 104. The radar system 102 can alternatively be implemented within any suitable computing device or electronic device, such as a desktop computer 200-1, a tablet 200-2, a laptop 200-3, a phone 200-4, a computing watch 200-5, computing glasses 200-6, a gaming system 200-7, a microwave 200-8, and a vehicle 200-9. Other devices may also be used, such as televisions, drones, track pads, drawing pads, netbooks, e-readers, home-automation and control systems, and other home appliances. Note that the device can be wearable, non-wearable but mobile, or relatively immobile (e.g., desktops and appliances). The radar system 102 can be used as a stand-alone radar system or used with, or embedded within, many different devices or peripherals, such as in control panels that control home appliances and systems, in automobiles to control internal functions (e.g., volume, cruise control, or even driving of the car), or as an attachment to a laptop computer to control computing applications on the laptop.

The smartphone 104 includes one or more computer processors 202 and computer-readable medium 204, which includes one or more memory medium and storage medium. Applications and/or an operating system (not shown) embodied as computer-readable instructions on the computer-readable medium 204 can be executed by the computer processor 202 to provide some of the functionalities described herein. The computer-readable medium 204 also includes a radar-based application 206, which uses radar data generated by the radar system 102 to perform a function, such as controlling the smartphone 104 or providing collision avoidance for autonomous driving.

The smartphone 104 may also include a network interface 208 for communicating data over wired, wireless, or optical networks. For example, the network interface 208 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. The smartphone 104 may also include a display.

The radar system 102 includes a communication interface 210 to transmit the radar data to a remote device, though this need not be used when the radar system 102 is integrated within the smartphone 104. In general, the radar data provided by the communication interface 210 is in a format usable by the radar-based application 206.

The radar system 102 also includes at least one antenna array 212 and at least one transceiver 214 to transmit and receive radar signals. The antenna array 212 includes at least one transmitting antenna element and at least two receiving antenna. In some cases, the antenna array 212 may include multiple transmitting antenna elements to implement a multiple-input multiple-output (MIMO) radar capable of transmitting multiple distinct waveforms at a given time (e.g., a different waveform per transmitting antenna element). The receiving antenna elements can be positioned in a one-dimensional shape (e.g., a line) or a two-dimensional shape (e.g., a triangle, a rectangle, or an L-shape) for implementations that include three or more receiving antenna elements. The one-dimensional shape enables the radar system 102 to measure one angular dimension (e.g., an azimuth or an elevation) while the two-dimensional shape enables two angular dimensions to be measured (e.g., both azimuth and elevation).

Using the antenna array 212, the radar system 102 can form beams that are steered or un-steered, wide or narrow, or shaped (e.g., as a hemisphere, cube, fan, cone, or cylinder). The one or more transmitting antenna elements may have an un-steered omnidirectional radiation pattern or may be able to produce a wide steerable beam. Either of these techniques enable the radar system 102 to illuminate a large volume of space. To achieve target angular accuracies and angular resolutions, the receiving antenna elements can be used to generate thousands of narrow steered beams (e.g., 2000 beams, 4000 beams, or 6000 beams) with digital beamforming. In this way, the radar system 102 can efficiently monitor an external environment.

The transceiver 214 includes circuitry and logic for transmitting and receiving radar signals via the antenna array 212. Components of the transceiver 214 can include amplifiers, mixers, switches, analog-to-digital converters, filters, and so forth for conditioning the radar signals. The transceiver 214 can also include logic to perform in-phase/quadrature (I/Q) operations, such as modulation or demodulation. A variety of modulations can be used to produce the radar signals, including linear frequency modulations, triangular frequency modulations, stepped frequency modulations, or phase modulations. The transceiver 214 can be configured to support continuous wave or pulsed radar operations.

A frequency spectrum (e.g., range of frequencies) that the transceiver 214 can use to generate radar signals may encompass frequencies between 1 and 400 gigahertz (GHz), between 4 and 100 GHz, or between 57 and 63 GHz. In some cases, the frequency spectrum can be divided into multiple sub-spectrums that have similar or different bandwidths. Example bandwidths can be on the order of 500 megahertz (MHz), one gigahertz (GHz), two gigahertz, and so forth. Different frequency sub-spectrums may include, for example, frequencies between approximately 57 and 59 GHz, 59 and 61 GHz, or 61 and 63 GHz. Although the example frequency sub-spectrums described above are contiguous, other frequency sub-spectrums may not be contiguous. To achieve coherence, multiple frequency sub-spectrums (contiguous or not) that have a same bandwidth may be used by the transceiver 214 to generate multiple radar signals, which are transmitted simultaneously or separated in time. In some situations, multiple contiguous frequency sub-spectrums may be used to transmit a single radar signal, thereby enabling the radar signal to have a wide bandwidth.

The radar system 102 may also include one or more system processors 216 and a system medium 218 (e.g., one or more computer-readable storage medium). Although the system processor 216 is shown to be separate from the transceiver 214 in FIG. 2, the system processor 216 may be implemented within the transceiver 214 in some implementations. The system processor 216 executes computer-readable instructions that are stored within the system medium 218. Example digital operations performed by the system processor 216 can include Fast-Fourier transforms (FFTs), filtering, modulations or demodulations, signal generation, and so forth.

Although not shown, the radar system 102 can also include a controller. The controller can include at least one processor and computer-readable medium, which stores computer-executable instructions (such as the system processor 216 and the system medium 218). The processor and the computer-readable medium can be localized at one module or one integrated circuit chip or can be distributed across multiple modules or chips. Together, the processor and associated instructions can be realized in separate circuitry, fixed logic circuitry, hard-coded logic, and so forth. The controller can be implemented as part of the computer processor 202, the system processor 216, a general-purpose processor, some combination thereof, and so forth.

The system medium 218 includes a memory management module 220 (e.g., a memory management software module 220). The memory management module 220 instantiates at least one memory pool at compile time within a particular memory. The memory management module 220 can implement, at least partially, smart-phone based power-efficient radar processing and memory provisioning for detecting gestures, as further described with respect to FIG. 3-1.

Figures 1, 3:
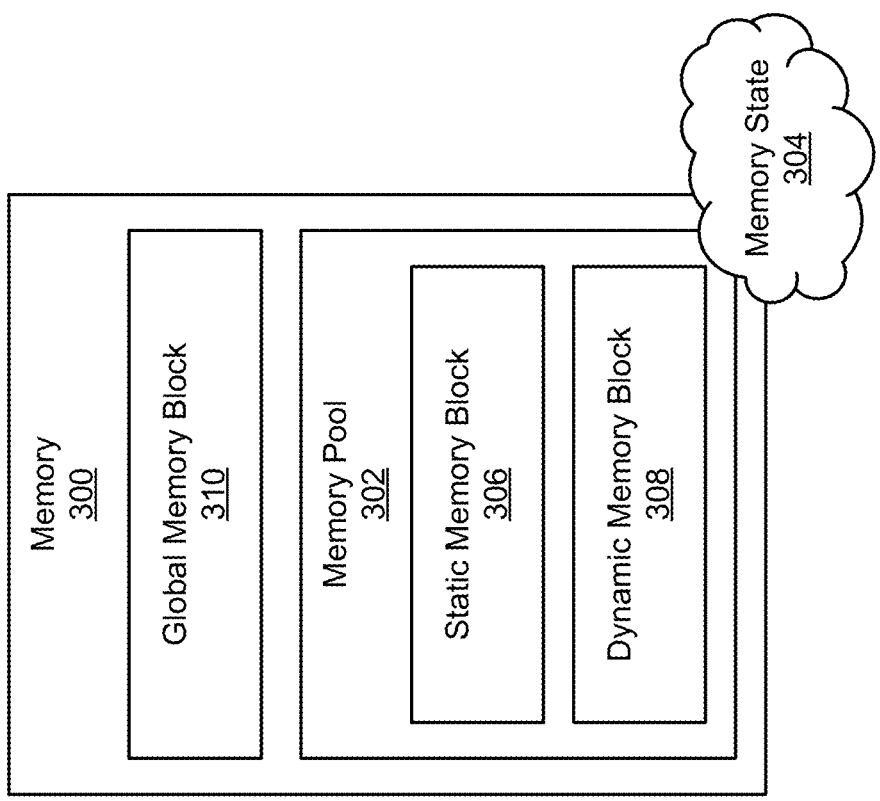
Figures 2, 3:
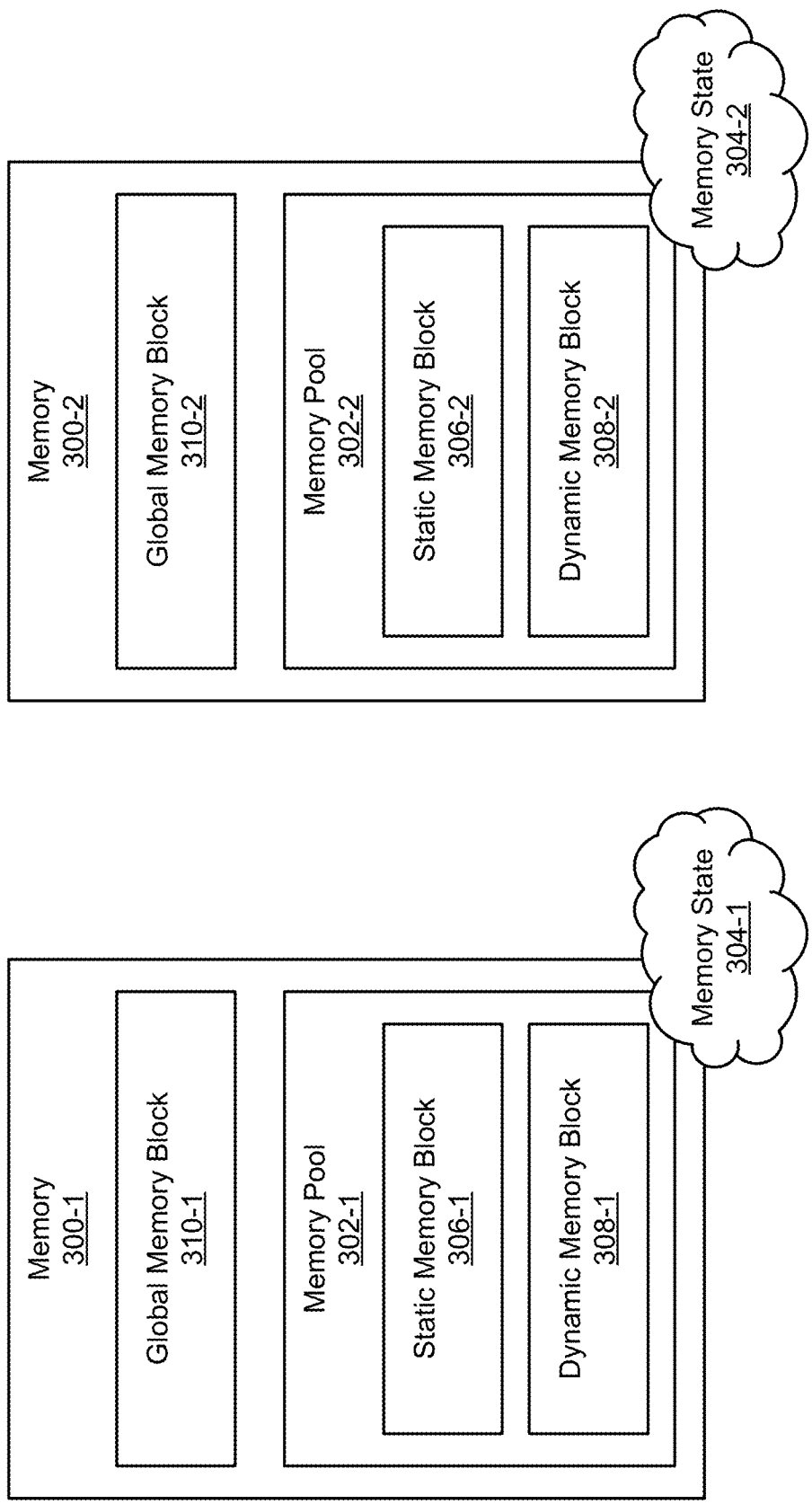

FIG. 3-1 illustrates example provisioning of a memory 300 by the memory management module 220 for gesture detection. In the depicted configuration, the memory management module 220 instantiates a memory pool 302 within the memory 300, which may comprise the system medium 218 of FIG. 2, the computer-readable medium 204, or any suitable type of computer-readable storage medium accessible by the memory management module 220. At compile time, the memory management module 220 determines a total size for the memory pool 302, which may be on the order of a few hundred kilobytes or several gigabytes, depending on an amount of memory that is available for radar processing. The memory pool 302 is configured for a current memory state 304, which is activated in response to a current situation or event associated with one or more users of the smartphone 104, as further described with respect to FIG. 4-1. For example, different memory states 304 may be associated with the user entering a room that the radar system 102 is located within, approaching the radar system 102, performing a gesture, and exiting the room. As the user moves around an environment or interacts with the radar system 102, different memory states 304 are activated by the memory management module 220 for the current situation.

Each memory state 304 comprises one or more sequences, which represent a series of radar processing operations that are executed by a processor to analyze data generated by the radar system 102. When the memory state 304 is active, the memory management module 220 allocates portions of the memory pool 302 for the sequence that is to be executed. If a size of the memory pool 302 is sufficient, multiple sequences may be allocated at once, even if the sequences are not executed concurrently. In other cases, the memory may be allocated for the sequences on an as-needed basis or based on a time at which the sequence is to be executed. The memory management module 220 may layout different buffers of various sizes within the memory pool 302 for the sequence. By recording a layout of the sequence in a registry, the sequence may be quickly engaged by reference.

According to the memory state 304, the memory management module 220 provisions the memory pool 302 with at least one static memory block 306 and at least one dynamic memory block 308. The static memory block 306 comprises memory that is shared between multiple sequences. The dynamic memory block 308 comprises memory that is passed between different compute blocks of a sequence or that is used by different compute blocks of different sequences. Characteristics of a sequence are further described with respect to FIG. 4-2. In some cases, a portion of the dynamic memory block 308 may be dedicated for a particular compute block for performing repetitive operations. A portion of the dynamic memory block 308, for example, may be used to store information for temporary arrays, which may be used to perform a FFT operation.

If multiple memory states 304 are supported and an active memory state 304 triggers activation of (or a transition to) another memory state 304, the memory management module 220 may release the memory within the memory pool 302 and reallocate the memory pool 302 according to the next memory state 304. In this case, the memory management module 220 may also provision a global memory block 310 within the memory 300. The global memory block 310 comprises memory that is shared between different memory states 304. In this way, a following memory state 304 does not have to perform the same operations that were performed by a previous memory state 304. As an example, a clutter map may be stored in the global memory block 310 so that sequences within different memory states 304 may reference or update the clutter map.

By reusing the memory pool 302 for different memory states 304 and sharing memory between different memory states 304 or different sequences, a total size of the memory pool 302 may be made significantly smaller relative to other radar systems. With efficient memory utilization, the radar system 102 may be incorporated within memory constrained devices or may be implemented within a smaller package size. If more than one memory 300 is available for radar processing, the memory management module 220 may instantiate multiple memory pools 302, as further described with respect to FIG. 3-2.

FIG. 3-2 illustrates example provisioning of multiple memories 300-1 and 300-2 by the memory management module 220 for gesture detection. In this case, the memories 300-1 and 300-2 represent physically separate memories, which may have similar or different sizes. For example, the memory 300-1 may comprise the system medium 218 and the memory 300-2 may comprise the computer-readable medium 204. In some cases, the memories 300-1 and 300-2 may be accessed by different processors. For example, the system processor 216 may utilize the memory 300-1 and the computer processor 202 may utilize the memory 300-2.

In the depicted configuration, the memory management module 220 instantiates a memory pool 302-1 within a memory 300-1 and configures the memory pool 302-1 according to a memory state 304-1. The memory management module 220 also instantiates a memory pool 302-2 within the memory 300-2 and configures the memory pool 302-2 according to a memory state 304-2. Consider that the memory state 304-1 is currently active and the system processor 216 executes the sequences within the memory state 304-1. In this case, the system processor 216 is a low-power processor that consumes less power relative to the computer processor 202. Within the memory state 304-1, a sequence detects a change in the situation of the user and causes the memory management module 220 to transition to the memory state 304-2. In this case, the transition activates the memory state 304-2 within the memory 300-2 and the computer processor 202 takes control of the radar processing and configuration of the radar system 102 according to the memory state 304-2. If the computer processor 202 that executes the sequences within the memory state 304-2 does not have access to the global memory block 310-1 in the memory 300-1, the memory management module 220 may pass information from the global memory block 310-1 to the global memory block 310-2. By assigning different memory states 304-1 and 304-2 to different processors 202 or 216, power may be conserved during radar processing by significantly reducing a duration for which a high-power processor operates. Different types of memory states 304 and sequences are further described with respect to FIGS. 4-1, 4-2, and 4-3.

Figures 1, 4:
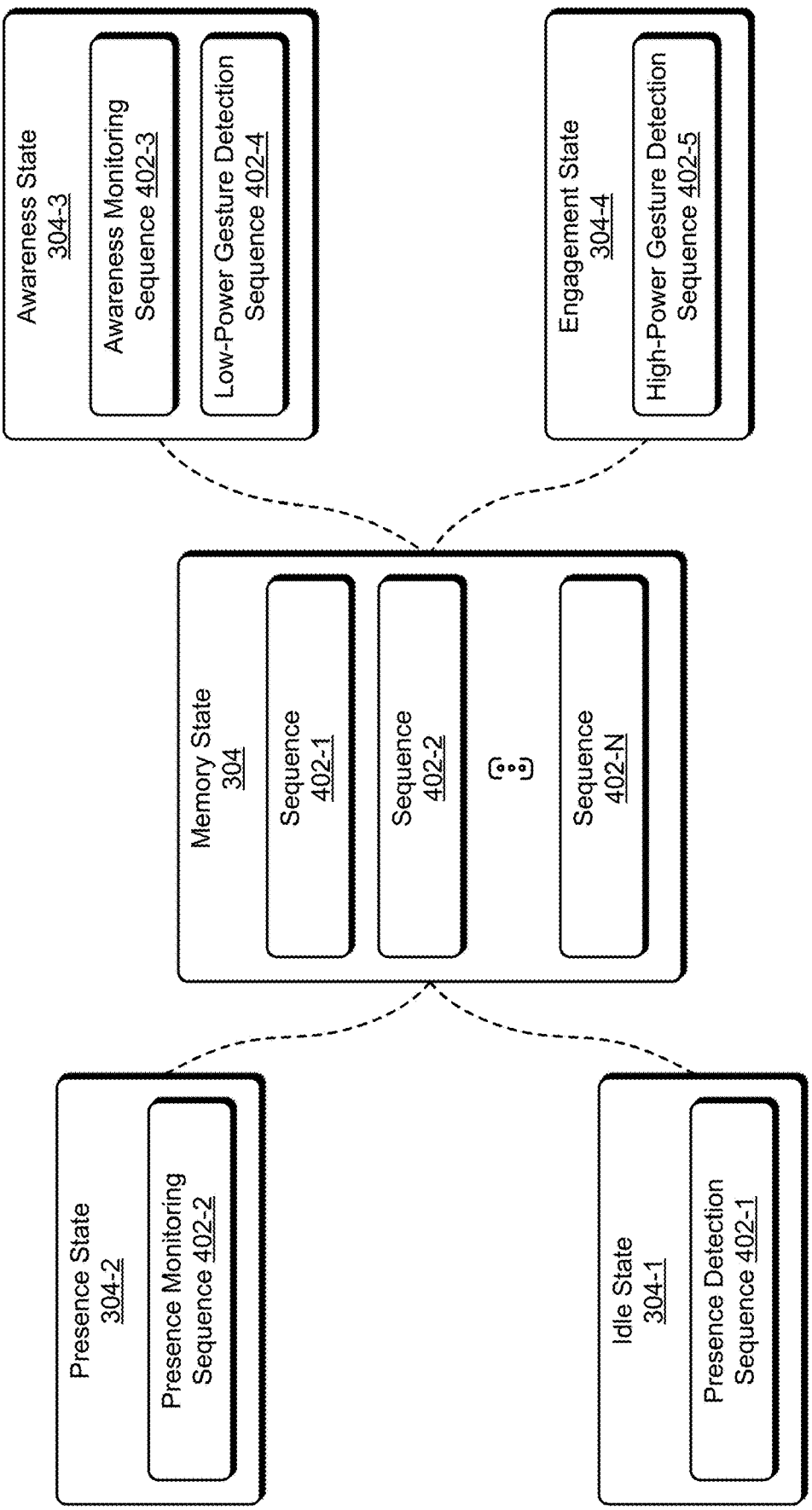
Figures 2, 4:
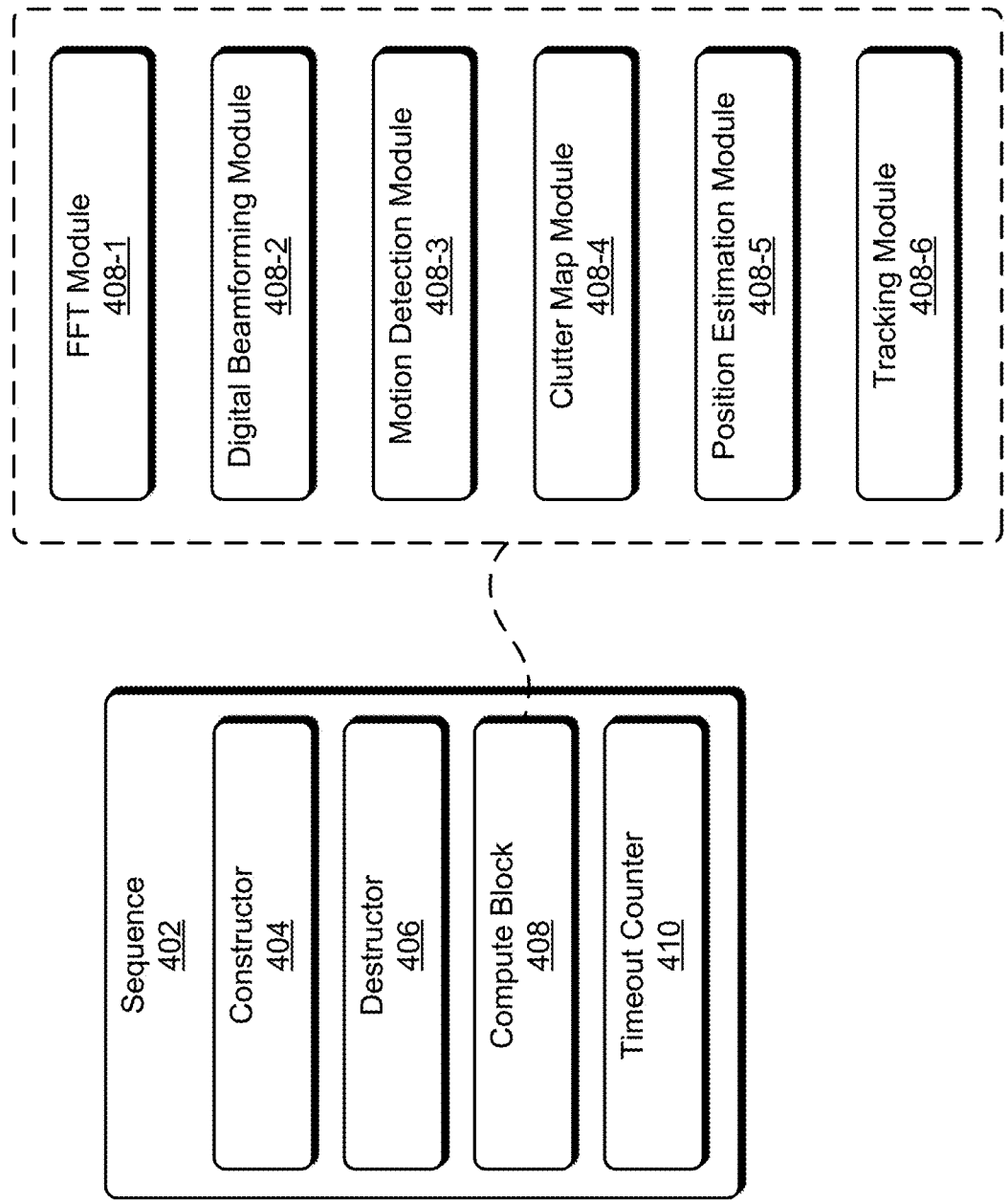
Figures 3, 4:
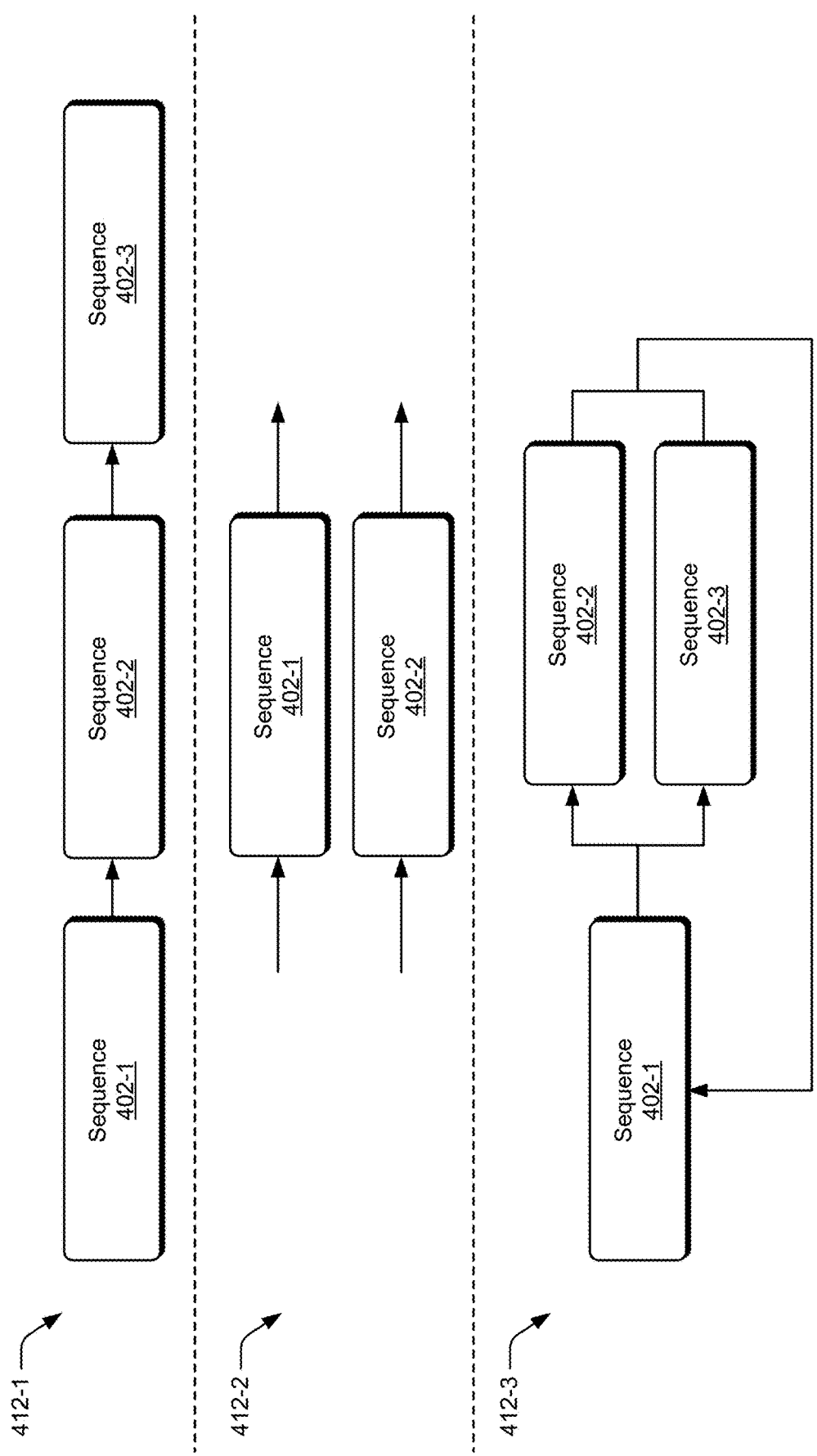

FIG. 4-1 illustrates example memory states 304 for smart-phone-based power-efficient radar processing and memory provisioning for detecting gestures. In this example, four example memory states 304 are shown to include an idle state 304-1, a presence state 304-2, an awareness state 304-3, and an engagement state 304-4. The idle state 304-1 is active if the user is not present. The presence state 304-2 is active if the user is present and far from the radar system 102 (e.g., beyond a range threshold). The awareness state 304-3 is active if the user is close to the radar system 102 (e.g., within the range threshold) or is interacting with the smartphone 104. The engagement state 304-4 is active if the user is interacting with the radar system 102 by performing an action the radar system 102 is designed to detect, such as a gesture.

Each memory state 304 includes one or more sequences 402, such as sequences 402-1, 402-2 . . . 402-N, with N being a positive integer. A sequence 402 comprises a set of functions or logical operations that may be performed if the memory state 304 is active. The sequence 402 generates a particular output, which can include radar data for the radar-based application 206, a trigger that initiates execution of another sequence 402, or another trigger that initiates a transition to another memory state 304. As shown in FIG. 4-1, the idle state 304-1 and the presence state 304-2 respectively include a presence detection sequence 402-1 and a presence monitoring sequence 402-2. The awareness state 304-3 includes an awareness monitoring sequence 402-3 and a low-power gesture detection sequence 402-4, both of which may be executed concurrently (e.g., in parallel). The engagement state 304-4 includes one or more high-power gesture detection sequences 402-5. The different types of sequences 402 and memory states 304 mentioned in FIG. 4-1 are further described with respect to FIG. 5. Characteristics of an example sequence 402 are further described with respect to FIG. 4-2.

FIG. 4-2 illustrates an example sequence 402 for smartphone based power-efficient radar processing and memory provisioning for detecting gestures. In the depicted configuration, the sequence 402 is shown to include a constructor 404, a destructor 406, and at least one compute block 408. The sequence 402 may also include a timeout counter 410. If the timeout counter 410 is enabled (e.g., set to a non-negative value), the sequence 402 proceeds to a next step upon expiration of the timeout counter 410 (e.g., when the timeout counter 410 reaches a negative number). This next step may comprise passing data to another compute block 408, causing the processor to execute another compute block 408, storing data within the static memory block 306 that can be referenced by another sequence 402 within the memory state 304, or initiating a transition to another sequence 402 or another memory state 304.

Different types of compute blocks 408 may be executed within the sequence 402. As an example, the compute block 408 may comprise a FFT module 408-1, a digital beamforming module 408-2, a motion detection module 408-3, a clutter map module 408-4, a position estimation module 408-5, or a tracking module 408-6. The FFT module 408-1 may generate pre-processed data (e.g., a map of complex data associated with different range and time intervals) or range-Doppler data (e.g., a map of complex data associated with different range and Doppler frequency intervals). To determine an angular position of one or more targets, the digital beamforming module 408-2 generates a spatial map of complex data associated with one or more angles (e g, azimuth or elevation). Different types of beamforming algorithms may be employed by the digital beamforming module 408-2, such as a Fourier beamforming algorithm, a minimum various distortionless response (MVDR) (e.g., Capon) beamforming algorithm, a multiple signal classification (MUSIC) beamforming algorithm, an estimation of signal parameters via rotational invariance techniques (ESPRIT) algorithm, or a compressive sensing-based beamforming algorithm. The motion detection module 408-3 determines whether or not motion occurs within the environment. The clutter map module 408-4 generates a clutter map to maintain knowledge of undesired objects that exist in the environment. The clutter map may be used to reduce a false-alarm rate of the radar system 102. The position estimation module 408-5 determines a range, azimuth, or elevation of a target based on the range-Doppler map or the spatial map. The tracking module 408-6 maintains a history of relative positions or motions of one or more targets or predicts future positions of the targets. Some compute block 408 may also utilize machine learning techniques to analyze the radar data.

In some implementations, the compute block 408 is called for each frame of radar data that is collected by the radar system 102. The frame represents a duration of time over which one or more chirps are transmitted by the radar system 102. The sequence 402 may also configure the radar system 102's hardware (e.g., such as the antenna array 212 or the transceiver 214) for transmitting and receiving a particular type of radar signal or series of radar signals. The sequence 402, for example, may specify use of a particular modulation type, bandwidth, frequency, duty cycle, time-on-target, transmit power, set of antenna elements within the antenna array 212, and so forth. One contributing factor to a quantity of power that is consumed by the radar system 102 is the duty cycle. By specifying a lower duty cycle, the sequence 402 enables the radar system 102 to conserve power. If a high duty cycle is specified, however, the sequence 402 may increase responsiveness to detecting situational changes or analyzing fast or nearby motions. Different sequences 402 may be executed in series, parallel, or a combination thereof, as further described with respect to FIG. 4-3.

FIG. 4-3 illustrates different forms of execution of multiple sequences 402 within an active memory state 304. At 412-1, the sequences 402-1, 402-2, and 402-3 are executed in series. This may occur if the sequences 402-1, 402-2, and 402-3 are designed to configure the radar system 102 differently. In some cases, each sequence 402-1, 402-2, and 402-3 may be associated with a different power mode and the progression from sequence 402-1 to 402-3 may incrementally increase power consumption within the radar system 102. At 412-2, the sequences 402-1 and 402-2 run concurrently. In this case, the sequences 402-1 and 402-2 may utilize a same configuration of the radar system 102. At 412-3, a combination of series and parallel forms of execution of the sequences 402-1, 402-2, and 402-3 occur. Execution of the example sequences 402-1 to 402-5 shown in FIG. 3-1 are further described with respect to FIG. 5.

Figure 5:
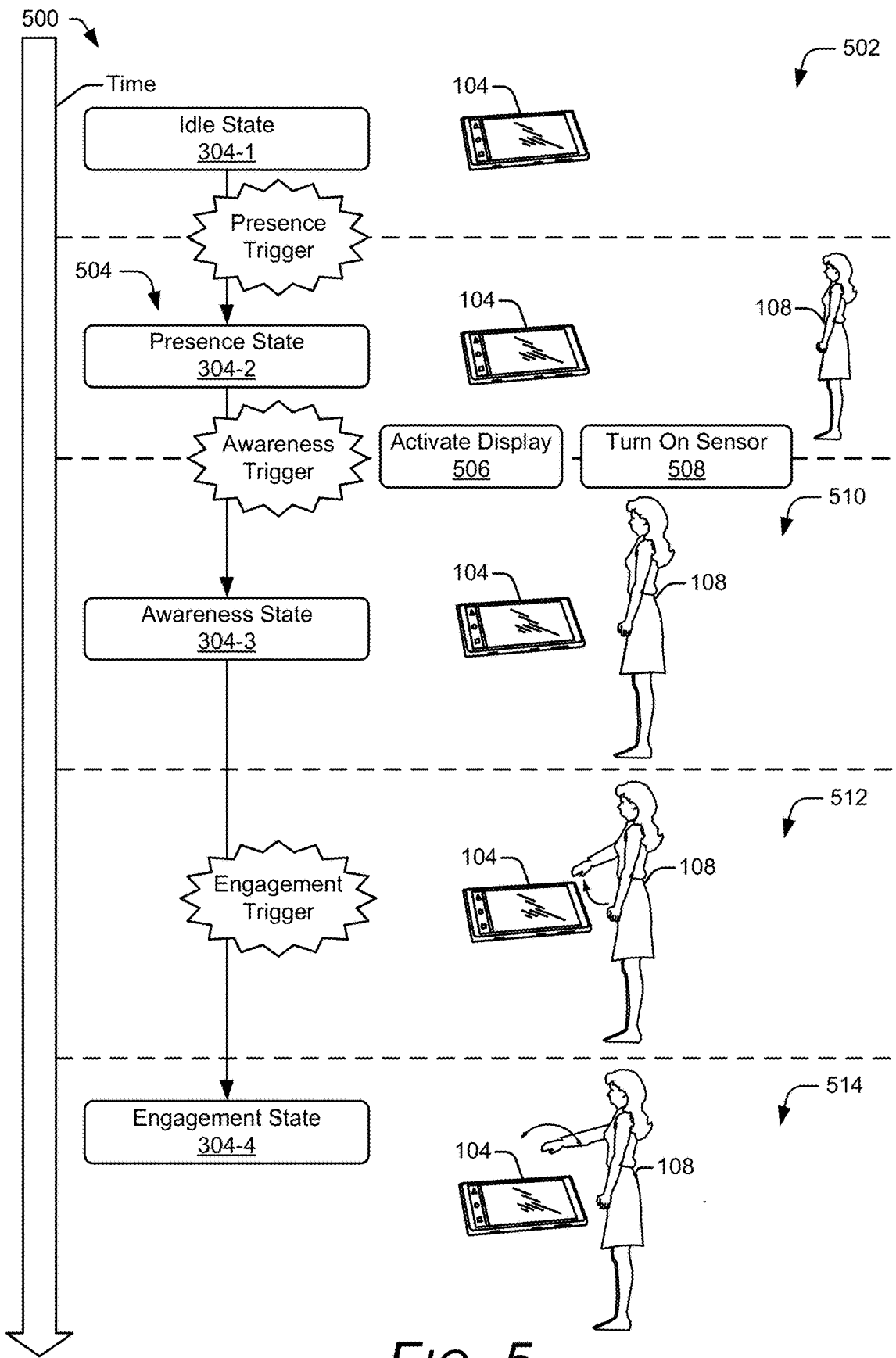
FIG. 5 illustrates an example sequence flow diagram for activating different memory states.

FIG. 5 illustrates an example sequence flow diagram 500 for activating different memory states 304, with time elapsing in a downward direction. At 502, the user 108 is not present or is outside a detectable range of the radar system 102. For example, the user 108 may be on the order of several meters from the smartphone 104 (e.g., at distances greater than approximately two meters) or in a different room than the smartphone 104. At this time, the memory management module 220 allocates the memory pool 302 according to the idle state 304-1, which is the memory state 304 that is currently active. In some cases, the idle state 304-1 may be activated at start-up or in response to power being supplied to the radar system 102. The idle state 304-1 executes the presence detection sequence 402-1, which causes the radar system 102 to monitor the environment in a low-power mode (e.g., by using a low duty cycle). The presence detection sequence 402-1 analyzes the data that is collected by the radar system 102 to detect if the user 108 is present. If the presence detection sequence 402-1 detects the presence of the user 108 (e.g., the user 108 entering the detectable range of the radar system 102), the presence detection sequence 402-1 produces an output (e.g., a flag) that triggers a transition from the idle state 304-1 to the presence state 304-2.

At 504, the presence state 304-2 is active and the presence monitoring sequence 402-2 monitors a distance to the user 108. At this time, the user 108 may be within a few meters from the smartphone 104 (e.g., between approximately 1 and 2 m). The presence monitoring sequence 402-2 causes the radar system 102 to operate in a medium-low power mode using a medium-low duty cycle, which is sufficient to follow the user 108. As the user 108 moves around in the environment, if the user 108 comes within a specified range to the smartphone 104, the presence monitoring sequence 402-2 initiates a transition from the presence state 304-2 to the awareness state 304-3. For example, the awareness state 304-3 may be triggered if the user 108 comes within a meter from the smartphone 104. In this case, the presence state 304-2 also activates a display 506 on the smartphone 104 or turns on another sensor 508, such as a camera. Alternatively, if the user 108 exits the detectable range of the radar system 102 (e.g., is no longer present), the idle state 304-1 may be activated.

At 510, the awareness state 304-3 is active and the awareness monitoring sequence 402-3 and the low-power gesture detection sequence 402-4 are executed. The awareness monitoring sequence 402-3 monitors a location of the user 108 and triggers a transition to the presence state 304-2 if the user moves away from the 104. The low-power gesture detection sequence 402-4 monitors motion of at least one appendage of the user 108. To enable the radar system 102 to detect changes that may indicate the user 108 is preparing to perform a gesture or interact with the smartphone 104, the low-power gesture detection sequence 402-4 causes the radar system 102 to operate in a medium-high power mode and use a medium-high duty cycle. At 512, the user 108 raises a hand and the low-power gesture detection sequence 402-4 determines this motion is indicative of the user 108 preparing to make a gesture. This motion may also cause a portion of the user 108 to come within several centimeters (cm) from the smartphone 104 (e.g., within approximately 50 cm). The low-power gesture detection sequence 402-4 triggers a transition from the awareness state 304-3 to the engagement state 304-4.

At 514, the engagement state 304-4 is active and one or more high-power gesture detection sequences 402-5 may be executed to recognize the gesture. In the engagement state 304-4, the high-power gesture detection sequences 402-5 may cause the radar system 102 to operate in a high-power mode and use a high duty cycle such that the collected data enables the gesture to be recognized. An output of the high-power gesture detection sequence 402-5 may indicate an occurrence of a particular type of gesture, which can be used by the radar-based application 206 to control the smartphone 104. In some cases, multiple high-power gesture detection sequences 402-5 may be concurrently executed to recognize different types of gestures, such as a swipe gesture detection sequence and a reach gesture detection sequence. Because these gesture detection sequences may vary or utilize different types of compute blocks 408, executing these sequences in parallel enables the radar system 102 to determine whether the user is performing a swipe gesture, such as in environment 100-1, or performing a reach gesture, such as in environment 100-3. While different situations are occurring with the user 108 over time, the described techniques conserve power and efficiently utilize the available memory by dynamically provisioning the memory pool 302 according to the appropriate memory state 304. To support a variety of different devices, the memory management module 220 may customize which of the memory states 304 are available for a particular device.

Figure 6:
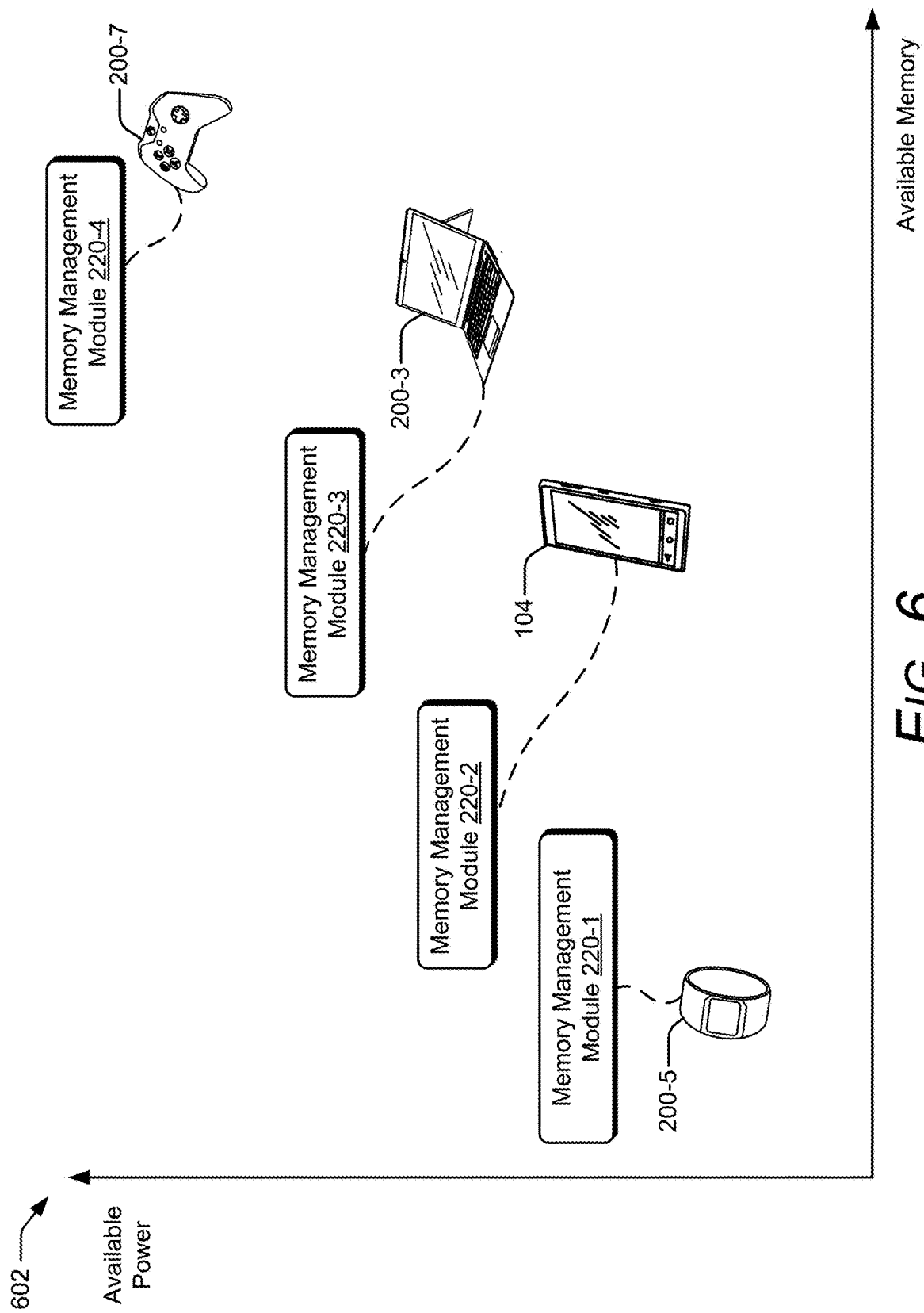
FIG. 6 illustrates an example suite of memory management modules that can be used to implement power-efficient radar processing and memory provisioning for detecting gestures.

FIG. 6 illustrates an example suite of memory management modules 220 that can be used to implement a radar system 102 capable of power-efficient radar processing and memory provisioning for detecting gestures. The example devices shown in FIG. 2 can vary in terms of available power, available memory, computational capability, types of radar-based applications 206 (e.g., gesture detection, presence detection, collision avoidance, or proximity detection), and physical size, which can affect a design of the radar system 102. In FIG. 6, a graph 602 illustrates differences between available power and available memory for the computing watch 200-5, the smartphone 104 of FIG. 1, the laptop 200-3 of FIG. 2, and the gaming system 200-7 of FIG. 2. In this example, the computing watch 200-5 is shown to have less available power and memory compared to the gaming system 200-7.

The suite of memory management modules 220 is shown to include memory management modules 220-1, 220-2, 220-3, and 220-4, which are designed to operate within the constraints or capabilities of the respective computing devices 200-5, 104, 200-3, and 200-7. For example, the memory management module 220-1 may be configured to activate memory states 304 that conserve power or perform simple operations for detecting whether a hand of the user 108 is to a left side or a right side of the computing watch 200-5. The memory management module 220-1 may also be configured to allocate memory for executing the sequences 402 within an active memory state 304 on an as-needed basis to enable gesture detection to be performed within the available memory of the computing watch 200-5.

In contrast, a high-power, computationally-intensive memory management module 220-4 can be implemented within the gaming system 200-7, which enables the user 108 to perform complex control gestures for a video game. In this case, the memory management module 220-4 may utilize memory states 304 that have sequences 402 that process a larger quantity of channels, beams, or data in general. The memory management module 220-4 may also be configured to allocate memory within the memory pool 302 for multiple sequences 402 at once to enable gesture detection to be performed.

Example Methods

Figure 7:
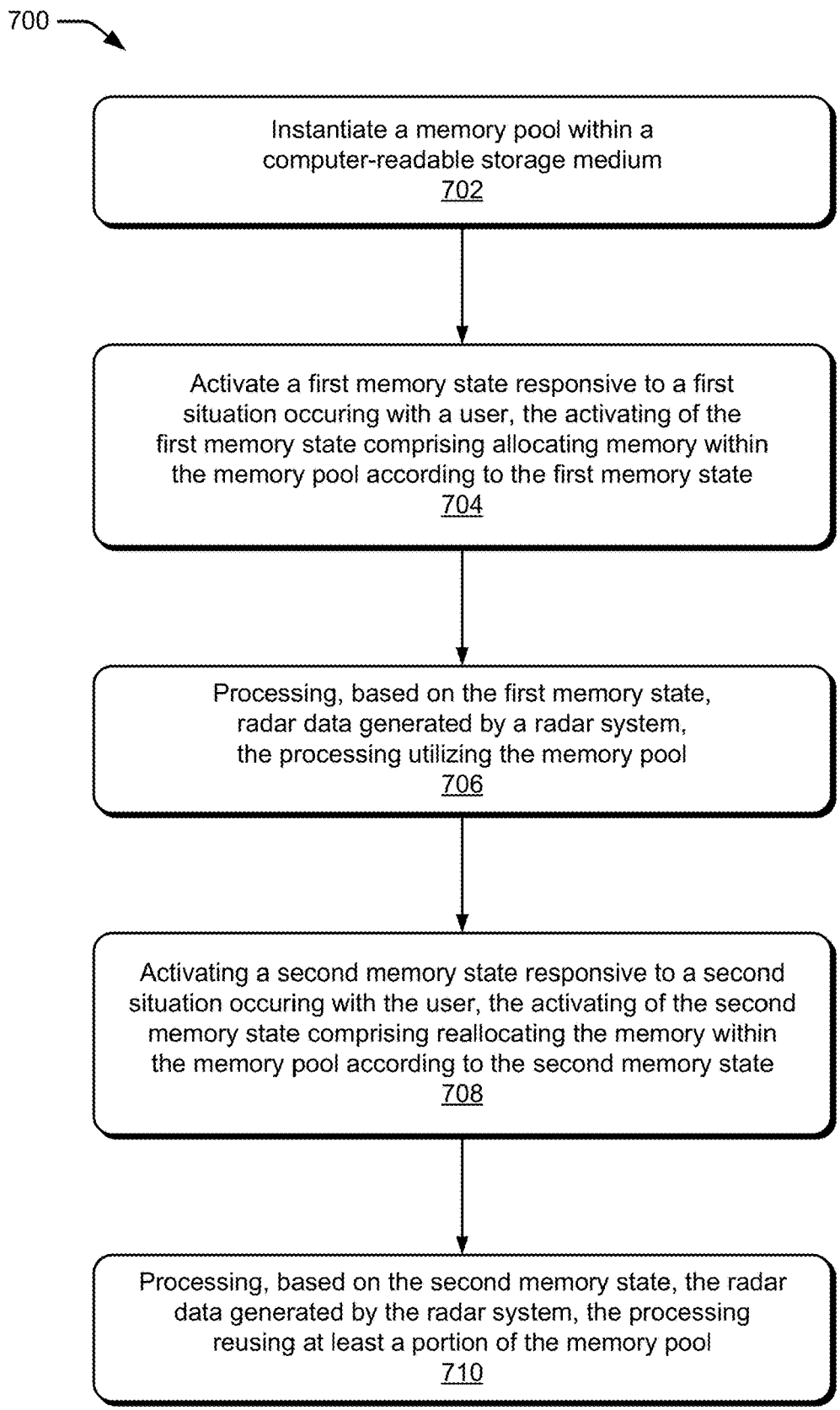
FIG. 7 illustrates an example method for smartphone-based power-efficient radar processing and memory provisioning for detecting gestures.

FIG. 7 depicts an example method 700 for power-efficient radar processing and memory provisioning for detecting gestures. Method 700 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to environment 100, FIG. 1, and entities detailed in FIG. 2, reference to which is made for example only. The techniques are not limited to performance by one entity or multiple entities operating on one device.

At 702, a memory pool is instantiated within a computer-readable storage medium. For example, the memory management module 220 instantiates the memory pool 302 within the memory 300, as shown in FIG. 3-1. The memory 300 may comprise the system medium 218 or other suitable memory that is available within the radar system 102. In some cases, the memory management module 220 may instantiate multiple memory pools 302 in physically separate memories 300, such as the memory pools 302-1 and 302-2 within the memories 300-1 and 300-2, as shown in FIG. 3-2.

At 704, a first memory state is activated responsive to a first situation occurring with a user. The activating of the first memory state comprises allocating memory within the memory pool according to the first memory state. For example, the memory management module 220 activates the memory state 304, which may comprise the idle state 304-1, the presence state 304-2, the awareness state 304-3, or the engagement state 304-4 depending on the situation that occurs with the user, as shown in FIG. 5. The memory management module 220 allocates the memory within the memory pool 302 according to the active memory state 304. In FIG. 3-1, the memory management module 220 allocates the static memory block 306 and the dynamic memory block 308 within the memory pool 302. Within the memory pool 302, the memory management module 220 may layout one or more sequences 402 that are to be executed by a processor or a controller.

At 706, radar data generated by a radar system is processed based on the first memory state. The processing utilizes the memory pool. For example, the system processor 216 processes the radar data that is generated by the radar system 102 based on the memory state 304. The memory state 304 includes at least one sequence 402, which includes at least one compute block 408 that is executed by the processor 216 to process the radar data. In some cases, the processor 216 may execute multiple sequences 402 in parallel. To perform the processing, the memory pool 302 is used for temporary storage for performing calculations, to share data between different sequences 402 via the static memory block 306, or to pass data between compute blocks 408 via the dynamic memory block 308.

At 708, a second memory state is activated responsive to a second situation occurring with the user. The activating of the second memory state comprises reallocating the memory within the memory pool according to the second memory state. For example, the memory management module 220 activates another memory state 304, which may comprise the idle state 304-1, the presence state 304-2, the awareness state 304-3, or the engagement state 304-4 depending on the situation that occurs with the user 108, as shown in FIG. 5. The memory management module 220 may release the memory within the memory pool 302 and reallocate the static memory block 306 and the dynamic memory block 308 according to the other memory state 304.

At 710, the radar data generated by the radar system is processed based on the second memory state. The processing reuses at least a portion of the memory pool. For example, the system processor 216 processes the radar data based on the other memory state 304. If the memory management module 220 allocates the memory pool 302 within the computer-readable medium 204, the computer processor 202 may process the radar data according to the other memory state 304. As different memory states 304 may be associated with different power modes of the radar system 102, switching between the different memory states 304 may also vary power consumption of the radar system 102. By activating a memory state associated with a low-power mode and using the memory state to trigger another memory state associated with a high-power mode, the radar system 102 may conserve power and facilitate mobile operation of the smartphone 104.

Example Computing System

Figure 8:
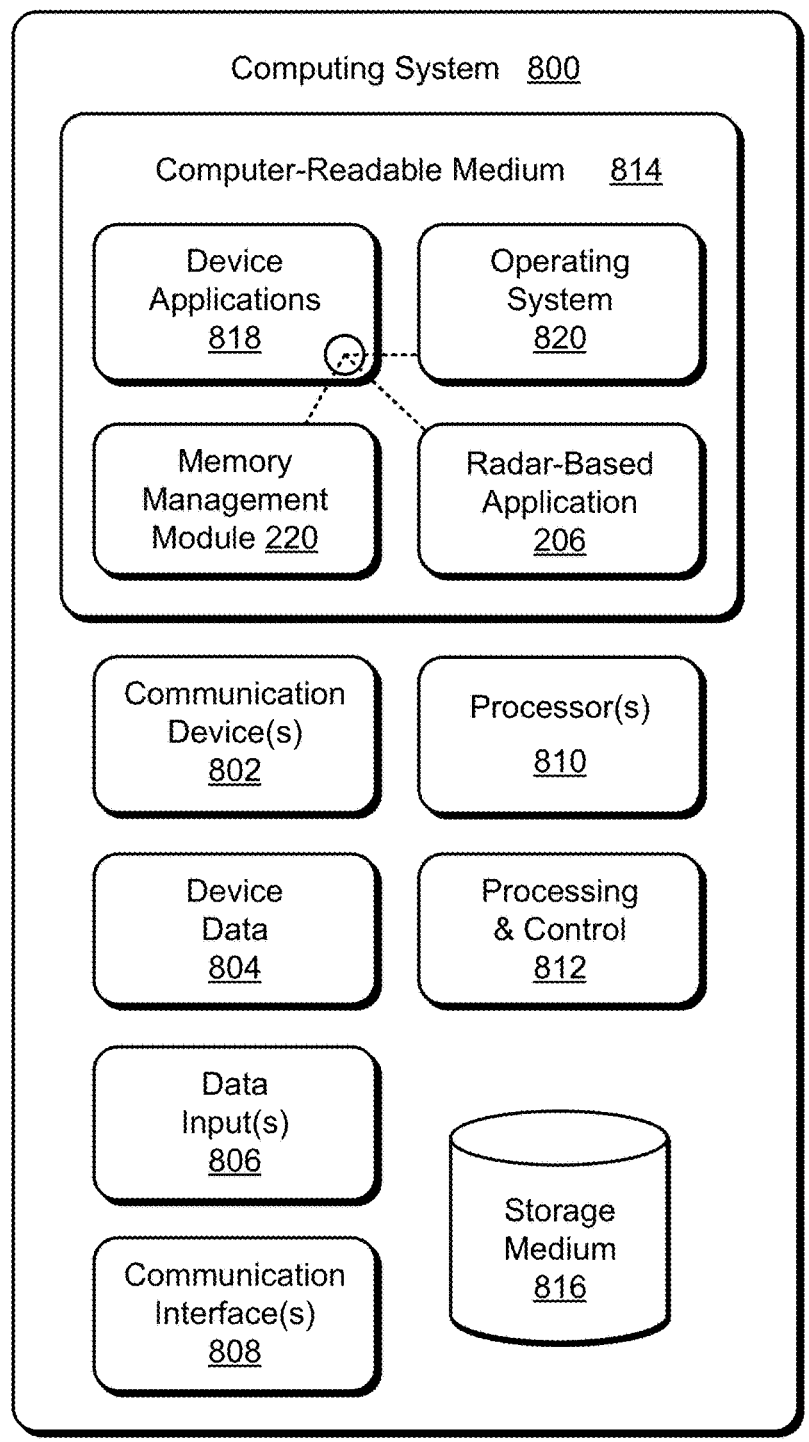
FIG. 8 illustrates an example computing system embodying, or in which techniques may be implemented that enable use of, smartphone-based power-efficient radar processing and memory provisioning for detecting gestures.

FIG. 8 illustrates various components of an example computing system 800 that can be implemented as any type of client, server, and/or computing device as described with reference to the previous FIG. 2 to perform smartphone-based power-efficient radar processing and memory provisioning for detecting gestures.

The computing system 800 includes communication devices 802 that enable wired and/or wireless communication of device data 804 (e.g., received data, data that is being received, data scheduled for broadcast, data packets of the data). The device data 804 or other device content can include configuration settings of the device, media content stored on the device, and/or information associated with a user of the device. Media content stored on the computing system 800 can include any type of audio, video, and/or image data. The computing system 800 includes one or more data inputs 806 via which any type of data, media content, and/or inputs can be received, such as human utterances, the radar-based application 206, user-selectable inputs (explicit or implicit), messages, music, television media content, recorded video content, and any other type of audio, video, and/or image data received from any content and/or data source.

The computing system 800 also includes communication interfaces 808, which can be implemented as any one or more of a serial and/or parallel interface, a wireless interface, any type of network interface, a modem, and as any other type of communication interface. The communication interfaces 808 provide a connection and/or communication links between the computing system 800 and a communication network by which other electronic, computing, and communication devices communicate data with the computing system 800.

The computing system 800 includes one or more processors 810 (e.g., any of microprocessors, controllers, and the like), which process various computer-executable instructions to control the operation of the computing system 800 and to enable techniques for, or in which can be embodied, radar angular ambiguity resolution. Alternatively or in addition, the computing system 800 can be implemented with any one or combination of hardware, firmware, or fixed logic circuitry that is implemented in connection with processing and control circuits which are generally identified at 812. Although not shown, the computing system 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 800 also includes a computer-readable medium 814, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 800 can also include a mass storage medium device (storage medium) 816.

The computer-readable medium 814 provides data storage mechanisms to store the device data 804, as well as various device applications 818 and any other types of information and/or data related to operational aspects of the computing system 800. For example, an operating system 820 can be maintained as a computer application with the computer-readable medium 814 and executed on the processors 810.

The device applications 818 may include a device manager, such as any form of a control application, software application, signal-processing and control module, code that is native to a particular device, a hardware abstraction layer for a particular device, and so on.

The device applications 818 also include any system components, engines, or managers to implement smartphone-based power-efficient radar processing and memory provisioning for detecting gestures. In this example, device applications 818 include the memory management module 220.

CONCLUSION

Although techniques using, and apparatuses including, power-efficient radar processing and memory provisioning for detection gestures have been described in language specific to features and/or methods, it is to be understood that the subject of the appended claims is not necessarily limited to the specific features or methods described. Rather, the specific features and methods are disclosed as example implementations of detecting a distributed target using power-efficient radar processing and memory provisioning for detecting gestures.

What is claimed is:

1. A smartphone comprising:
  a radar system configured to:
    transmit and receive multiple radar signals, at least one radar signal of the multiple radar signals reflected by a user of the smartphone; and
    detect, based on the multiple radar signals, different situations associated with the user, the different situations including:
      a first situation in which the user is outside a detectable range of the radar system; and
      a second situation in which the user performs a gesture, the radar system including:
    at least one processor; and
    at least one computer-readable storage medium comprising computer-executable instructions that, responsive to execution by the at least one processor, is configured to:
      create a memory pool within the at least one computer-readable storage medium; and
      adjust an allocation of memory within the memory pool according to different memory states that are respectively activated at different times according to the different situations that are detected by the radar system, the different memory states including:
        a first memory state that is activated responsive to detection of the first situation; and
        a second memory state that is activated responsive to detection of the second situation.

2. The smartphone of claim 1, wherein:
  the at least one computer-readable storage medium is configured to:
    allocate at least a portion of the memory pool for a first sequence of the first memory state while the first memory state is active for the first situation; and
    allocate at least another portion of the memory pool for a second sequence of the second memory state while the second memory state is active for the second situation; and
  the at least one processor is configured to:
    execute the first sequence while the first memory state is active to cause the radar system to conserve power; and
    execute the second sequence while the second memory state is active to recognize the gesture performed by the user.

3. The smartphone of claim 2, wherein the radar system is configured to:
  use a high duty cycle responsive to the second sequence being executed by the at least one processor; and
  use a low duty cycle responsive to the first sequence being executed by the at least one processor, the low duty cycle reducing power consumption of the radar system relative to the use of the high duty cycle.

4. The smartphone of claim 2, wherein:
  the second sequence comprises a swipe gesture detection sequence and a reach gesture detection sequence;
  the memory management module is configured to allocate at least the other portion of the memory pool for the swipe gesture detection sequence and the reach gesture detection sequence while the second memory state is active for the second situation; and
  the at least one processor is configured to concurrently execute both the swipe gesture detection sequence and the reach gesture detection sequence while the second memory state is active to determine whether the gesture performed by the user comprises a swipe gesture or a reach gesture.

5. The smartphone of claim 4, wherein the at least one computer-readable storage medium is configured to:
  allocate a static memory block within the memory pool to enable the static memory block to be shared by the swipe gesture detection sequence and the reach gesture detection sequence; and
  allocate a dynamic memory block within the memory pool to enable data within the dynamic memory block to be passed between at least two compute blocks of the swipe gesture detection sequence and to be passed between at least two other compute blocks of the reach gesture detection sequence.

6. The smartphone of claim 5, wherein the at least one computer-readable storage medium is further configured to:
  allocate the static memory block to store a clutter map that is shared by the swipe gesture detection sequence and the reach gesture detection sequence; and
  allocate the dynamic memory block to enable a first range-Doppler map to be passed between the at least two compute blocks of the swipe gesture detection sequence and a second range-Doppler map to be passed between the at least two other compute blocks of the reach gesture detection sequence.

7. The smartphone of claim 1, wherein the at least one computer-readable storage medium is configured to allocate a global memory block within the at least one computer-readable storage medium and outside of the memory pool to enable the global memory block to be shared by the different memory states.

8. The smartphone of claim 7, wherein the at least one computer-readable storage medium is further configured to allocate the global memory block to store a clutter map that is shared by the first memory state and the second memory state.

9. The smartphone of claim 1, further comprising another computer-readable storage medium, wherein:
  the at least one computer-readable storage medium is configured to:

instantiate another memory pool within the other computer-readable storage medium; and adjust an allocation of memory within the other memory pool according to other memory states that are respectively activated according to other situations that occur at other times.

10. The smartphone of claim 9, wherein the other computer-readable storage medium and the at least one computer-readable storage medium are physically separate memories.

11. The smartphone of claim 9, wherein:
the at least one computer-readable storage medium is configured to:
activate a third memory state of the other memory states responsive to a third situation of the other situations; and
allocate at least a portion of the other memory pool for one or more sequences of the third memory state while the third memory state is active for the third situation; and
the at least one processor is configured to execute the one or more sequences of the third memory state while the third memory state is active.

12. The smartphone of claim 11, wherein the radar system includes another processor configured to execute, while the first memory state is active, a first sequence that detects a transition from the first situation to the third situation and causes the at least one computer-readable storage medium to activate the third memory state.

13. The smartphone of claim 1, wherein:
the at least one computer-readable storage medium is configured to allocate at least a portion of the memory pool for multiple sequences of the first memory state that process radar data generated by the radar system; and
the at least one processor is configured to execute the multiple sequences in series or in parallel.

14. A computer-readable storage medium comprising computer-executable instructions that, responsive to execution by a processor, is configured to:
create a memory pool within the computer-readable storage medium to allocate a portion of the computer-readable storage medium for processing radar data;
allocate memory within the memory pool according to a first memory state, the first memory state including one or more first sequences for processing the radar data;
accept the radar data from a transceiver of a radar system, the radar data associated with a first reflected radar signal;
process, using the first memory state, the radar data associated with the first reflected radar signal by executing the one or more first sequences;
determine, based on the executing of the one or more first sequences, that a user is present within a detectable range of the radar system; and
adjust the allocation of memory within the memory pool by allocating the memory within the memory pool according to a second memory state, the second memory state including one or more second sequences for monitoring the user based on subsequent radar data provided by the radar system.

15. The computer-readable storage medium of claim 14, configured to selectively activate:
an idle state of the different memory states responsive to a first situation of the different situations that includes the user being outside a detectable range of the radar system;
a presence state of the different memory states responsive to a second situation of the different situations that includes the user being within the detectable range of the radar system and located at a range that is beyond a range threshold;
an awareness state of the different memory states responsive to a third situation of the different situations that includes the user being within the detectable range of the radar system and located at another range that is within the range threshold; and
an engagement state of the different memory states responsive to a fourth situation of the different situations that includes the user being within the detectable range of the radar system and performing a gesture.

16. The computer-readable storage medium of claim 15, wherein the memory management module is configured to allocate, while the idle state is active, at least a portion of the memory pool for a presence detection sequence of the idle state that, responsive to execution by the processor, is configured to:
cause the radar system to operate in a low-power mode to collect the radar data;
analyze the radar data to detect a presence of the user responsive to the user entering the detectable range of the radar system; and
cause the memory management module to activate the presence state responsive to the user entering the detectable range.

17. The computer-readable storage medium of claim 15, wherein the memory management module is configured to allocate, while the presence state is active, at least a portion of the memory pool for a presence monitoring sequence of the presence state that, responsive to execution by the processor, is configured to:
cause the radar system to operate in a medium-low power mode to collect the radar data;
analyze the radar data to determine the range to the user or to detect the user exiting the detectable range of the radar system;
cause the memory management module to activate the awareness state responsive to the range to the user being less than the range threshold; and
cause the memory management module to activate the idle state responsive to the user exiting the detectable range.

18. The computer-readable storage medium of claim 15, wherein the memory management module is configured to allocate, while the awareness state is active, at least a portion of the memory pool for a low-power gesture detection sequence of the awareness state that, responsive to execution by the processor, is configured to:
cause the radar system to operate in a medium-high power mode to collect the radar data;
analyze the radar data to determine the user is in the process of preparing to perform the gesture; and
cause the memory management module to activate the engagement state responsive to determination.

19. The computer-readable storage medium of claim 15, wherein the memory management module is configured to allocate, while the engagement state is active, at least a portion of the memory pool for at least one high-power gesture detection sequence of the engagement state that, responsive to execution by the processor, is configured to:
cause the radar system to operate in a high-power mode to collect the radar data;
analyze the radar data to recognize the gesture performed by the user; and cause the memory management module to activate the awareness state responsive to recognizing the gesture.

20. A method comprising:

transmitting and receiving multiple radar signals using a radar system, at least one radar signal of the multiple radar signals reflected by a user;

creating a memory pool within at least one computer-readable storage medium;

detecting, by the radar system and based on at least a portion of the multiple radar signals, a first situation in which the user is outside a detectable range of the radar system;

activating a first memory state responsive to the detecting of the first situation, the activating of the first memory state comprising allocating memory within the memory pool according to the first memory state;

processing, based on the first memory state, radar data generated by the radar system, the processing utilizing the memory pool;

detecting, by the radar system and based on at least another portion of the multiple radar signals, a second situation in which the user is inside the detectable range of the radar system;

activating a second memory state responsive to the detection of the second situation, the activating of the second memory state comprising reallocating the memory within the memory pool according to the second memory state; and processing, based on the second memory state, the radar data generated by the radar system, the processing reusing at least a portion of the memory pool.

* * * * *